Patented Mar. 10, 1942

2,275,565

UNITED STATES PATENT OFFICE 2,275,565

FORTIFYING CEREALS

Reginald C. Sherwood and John S. Andrews, St. Paul, Minn., assignors to General Mills, Inc., a corporation of Delaware No Drawing. Application September 22, 1938, Serial No. 231,182

6 Claims. (Cl. 99—11)

The present invention relates to a process of fortifying cereals and cereal products with one or more vitamins and more particularly to a process of emulsifying solutions of such vitamins and producing an emulsion which is adapted to be applied to cereals.

The principal object of our invention is to provide a process of producing an emulsion of vitamins in which an oil-soluble vitamin and a water-soluble vitamin are emulsified in an emulsion containing a negligible amount of water.

Another object of our invention is to increase the vitamin content of cereals and cereal products by the addition thereto of an emulsion containing vitamins D and $B_1$.

A further object of our invention is to provide a carrier or vehicle for vitamins which will enhance the flavor of cereals and cereal products to which it is added.

A still further object of our invention is to provide an oil emulsion of a water-soluble vitamin which is adapted to be applied to cereals and cereal products, said emulsion comprising a vitamin, an oil vehicle therefor, and a negligible amount of water.

It has heretofore been the practice to increase the vitamin content, or to fortify cereals and cereal products with vitamins such as vitamin D by adding thereto an oil solution containing the vitamin. However, certain cereals, such as corn cereals are deficient in certain vitamins, such as vitamin $B_1$ which is soluble chiefly in water. However, it is well known that the addition of an appreciable amount of water excessively raises the moisture content of the cereal, making it tough and unpalatable.

Our invention is based on the discovery that the above-mentioned difficulties may be obviated by dissolving vitamin $B_1$ in a small amount of water, and then emulsifying with oil, which may contain vitamin D, by the incorporation of an emulsifying agent therewith. The resulting emulsion may be further diluted with oil, the amount depending upon the amount of vitamin and oil desired to be incorporated in the cereal.

In practicing our invention, we first dissolve vitamin $B_1$, preferably in crystalline form, in a small amount of water, in the proportion of about one part of the vitamin to three parts of water. This concentrated aqueous solution is then emulsified with a vegetable oil such as peanut oil, sesame oil, corn oil, or cocoanut oil, which oil may contain an oil-soluble vitamin such as vitamin D or vitamin A, using as an emulsifying agent saturated or unsaturated fatty esters of polyglycerol, lecithin or glycerol laurate, in the proportion of about one and one-half parts of emulsifying agent to each part of crystalline vitamin $B_1$. This emulsification may be carried out by placing the above-mentioned ingredients in a suitable emulsifier and suitably agitating the ingredients until a thorough dispersion of the two phases—oil and water—has been accomplished. This emulsified product may then be diluted, if desired, by adding it to a suitable quantity of a vegetable oil of the types mentioned above, so that an emulsion suitable for spraying is obtained. The resulting product may be applied to cereal and to other cereal products by spraying it on the cereal in any desired manner by means of spraying apparatus which are well known in the art.

In case it is desired to fortify the so-called ready to serve cereals with our vitamin emulsion, it is preferable to add the emulsion to the cereal after it has been cooked, as cooking may destroy the potency of the vitamins contained in the emulsion.

The following specific example will serve to illustrate and explain our invention. 1 gram of vitamin $B_1$ crystals was dissolved in 2.9 grams of water. 1.5 grams of an unsaturated fatty ester of polyglycerol was then added to the aqueous vitamin solution and the mixture was vigorously shaken in a closed vessel. 14.5 grams of a vitamin D concentrate dissolved in cotton seed oil, containing approximately 6,000,000 U. S. P. units of vitamin D was then added to the previously formed mixture and the resultant mixture was then shaken vigorously until the oil and water solutions were well emulsified. The thick creamy emulsion which results was then shaken vigorously with 100 grams of melted cocoanut oil. This emulsion was then mixed, with stirring, with sufficient cocoanut oil to make a final weight of 9,375 grams. After stirring this emulsion a few minutes, a product differing in appearance from the original cocoanut oil only in the presence of a slight cloudiness was obtained. This emulsion was then placed in a spraying apparatus and was sufficient to treat 1650 pounds of cereal, such as a puffed corn cereal, and was sufficient to provide 11.3 International units of vitamin $B_1$ per ounce of cereal and 220 U. S. P. units of vitamin D per ounce of cereal, as established by bioassay of the cereal product.

The amount of water originally used in producing the above described emulsion amounted to 3 grams and in the above example, this was dispersed over 1650 pounds of cereal. It had no demonstrable effect upon the moisture content of the treated cereal. The amount of water added was equivalent to .0004% of the weight of the cereal, as shown by calculations.

By the term "emulsion" in this specification we include an emulsion which may be diluted with oil to any desired degree. It is known to the art that the type of emulsion herein defined should preferably be one in which the external phase is the oil and the internal phase is an aqueous solution since under these conditions additional quantities of oil may be readily mixed with the emulsion.

It is well known to the art that vitamin $B_1$ is much more stable in an acid or neutral medium than in one that is alkaline. For this reason it is desirable to promote stability of the vitamin by employing emulsifying agents which will maintain an acid or neutral reaction.

Our improved emulsion may be applied in any suitable manner to cereals, such as flour, to fortify the flour with vitamins D and $B_1$. Also, the vitamin containing emulsion may be applied to puffed corn cereals, wheat cereal, puffed rice, and other farinaceous cereals.

The particular quantity of our emulsion which is applied to flour and other cereals will vary with the nature of the flour or other cereal to which it is applied, the moisture content of the cereal, and the amount of fat which may be incorporated in the cereal. For example, certain cereals such as puffed corn cereal have a porous outer surface which permits of the absorption of a considerable quantity of fat without the cereal becoming greasy. On the other hand, flaked cereals have a somewhat glazed outer surface and a thin body portion which does not permit the absorption of considerable quantities of fat without the cereal becoming unduly greasy.

In case a vegetable oil vehicle is employed in our emulsion which is a solid at room temperature, such as cocoanut oil, it must be melted to produce the emulsion and must be kept at a slightly elevated temperature when the emulsion is applied to cereals.

While the invention has been described in detail with specific examples, such examples are illustrative and are not given as limitations, since other modifications within the spirit and scope of the invention will be apparent to those skilled in the art. Hence, the invention is to be understood as limited only as indicated, in the appended claims, in which the intent is to set forth all the novelty over the prior art.

We claim as our invention:

1. A process of fortifying, with a water-soluble vitamin, cereal products whose physical properties are deleteriously affected by water, which comprises distributing a water-in-oil emulsion containing a water-soluble vitamin and containing only a minor amount of water, on said cereal product in an amount sufficient to substantially increase the vitamin content of said product but insufficient to deleteriously affect the physical properties thereof to any substantial extent.

2. A process of fortifying, with a water-soluble vitamin, a ready-to-eat cereal whose physical properties are deleteriously affected by water, which comprises distributing on said cereal a water-in-oil emulsion containing a water-soluble vitamin and containing only a minor amount of water, in an amount sufficient to substantially increase the vitamin content of said cereal but insufficient to deleteriously affect the crispness of said cereal to any substantial extent.

3. A process of fortifying, with vitamin $B_1$, cereal products whose physical properties are deleteriously affected by water, which comprises distributing a water-in-oil emulsion containing a water soluble vitamin and containing only a minor amount of water, on said cereal product in an amount sufficient to substantially increase the vitamin content of said product but insufficient to deleteriously affect the physical properties thereof to any substantial extent.

4. A process of fortifying, with a water-soluble vitamin and an oil-soluble vitamin, a ready-to-eat cereal whose physical properties are deleteriously affected by water which comprises distributing a water-in-oil emulsion containing a water-soluble vitamin and an oil-soluble vitamin and containing only a minor amount of water, on said cereal in an amount sufficient to substantially increase the vitamin content of said cereal but insufficient to deleteriously affect the crispness of said cereal to any substantial extent.

5. A process of fortifying, with vitamins $B_1$ and D, a ready-to-eat cereal whose physical properties are deleteriously affected by water, which comprises distributing a water-in-oil emulsion containing vitamins $B_1$ and D and containing only a minor amount of water, on said cereal in an amount sufficient to substantially increase the vitamin content of said cereal but insufficient to deleteriously affect the crispness of said cereal to any substantial extent.

6. A process of fortifying, with vitamins $B_1$ and D, a ready-to-eat cereal whose physical properties are deleteriously affected by water, which comprises preparing a water-in-oil emulsion containing vitamins $B_1$ and D in which the water does not exceed one per cent of the weight of the emulsion, adding said emulsion to said cereal in an amount sufficient to substantially increase the vitamin content of said cereal but insufficient to deleteriously affect the crispness of said cereal to any substantial extent.

REGINALD C. SHERWOOD.
JOHN S. ANDREWS.